(12) United States Patent
Ho et al.

(10) Patent No.: US 6,398,363 B1
(45) Date of Patent: Jun. 4, 2002

(54) FIELD SEQUENTIAL COLOR PROJECTION DISPLAY SYSTEM

(75) Inventors: Fang Chuan Ho; Jinn-Chou Yoo; Wei Shen, all of Hsinchu (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/524,051

(22) Filed: Mar. 13, 2000

(30) Foreign Application Priority Data

Oct. 14, 1999 (TW) .......................................... 8817759 A (51) Int. Cl.[7] .............................................. G03B 21/14
(52) U.S. Cl. ............................ 353/20; 353/33; 348/742
(58) Field of Search .............................. 353/31, 20, 84, 353/33, 98; 348/742, 743, 755, 771

(56) References Cited

U.S. PATENT DOCUMENTS

| | | | | |
|---|---|---|---|---|
| 4,786,146 A | * | 11/1988 | Ledebuhr ...................... | 353/20 |
| 5,172,221 A | * | 12/1992 | Ko .............................. | 359/63 |
| 5,534,949 A | * | 7/1996 | Baron ......................... | 348/742 |
| 5,654,775 A | * | 8/1997 | Brennesholtz ............... | 353/31 |
| 5,863,125 A | * | 1/1999 | Doany .......................... | 353/84 |
| 5,895,109 A | * | 4/1999 | Yamaguchi et al. .......... | 353/31 |
| 6,113,239 A | * | 9/2000 | Sampsell et al. ............. | 353/31 |
| 6,183,091 B1 | * | 2/2001 | Johnson et al. .............. | 353/20 |
| 6,203,160 B1 | * | 3/2001 | Ho .............................. | 353/84 |
| 6,217,174 B1 | * | 4/2001 | Knox .......................... | 353/31 |
| 6,224,216 B1 | * | 5/2001 | Parker et al. ................. | 353/31 |

\* cited by examiner

Primary Examiner—William Dowling
(74) Attorney, Agent, or Firm—Beyer Weaver & Thomas, LLP (57) ABSTRACT

A field sequential color projection display system, which has high brightness, high accuracy and compact size, and is light and energy saving. The field sequential color projection system comprises: a field sequential beam splitting/combining light valve module including three light valves, which can be controlled by applied energy field, for outputting polarized light of three primary colors in time sequence; a frame sequential display module for respectively displaying frames of three primary colors corresponding to the polarized light of three primary colors output in time sequence, wherein the polarized light passes through the frame sequential display module; a projection lens module for projecting the polarized light passing through the frame sequential display module onto a screen to produce a full color image.

10 Claims, 8 Drawing Sheets

FIELD SEQUENTIAL COLOR PROJECTION DISPLAY SYSTEM

BACKGROUND OF THE INVENTION

1. Field of the Invention

This invention relates to a projection-type display system, and particularly to a field sequential color projection display system.

2. Description of Prior Art

LCD projection systems demand high brightness, high accuracy, excellent image quality and low cost, as well as compact size.

In an LCD projection system, the light source has to be effectively used in order to provide high brightness, thus requiring the use of a P/S converter and micro-lens and so on. A reflective-type LCLV (liquid crystal light valve) can further improve the image brightness and accuracy. Smaller LCD panels facilitate reducing the volume of the optical engine. However, the optical design and the cost of the system tend to trade-off with quality. It is difficult to provide a good quality LCD projection system at a low cost.

Figure 1:
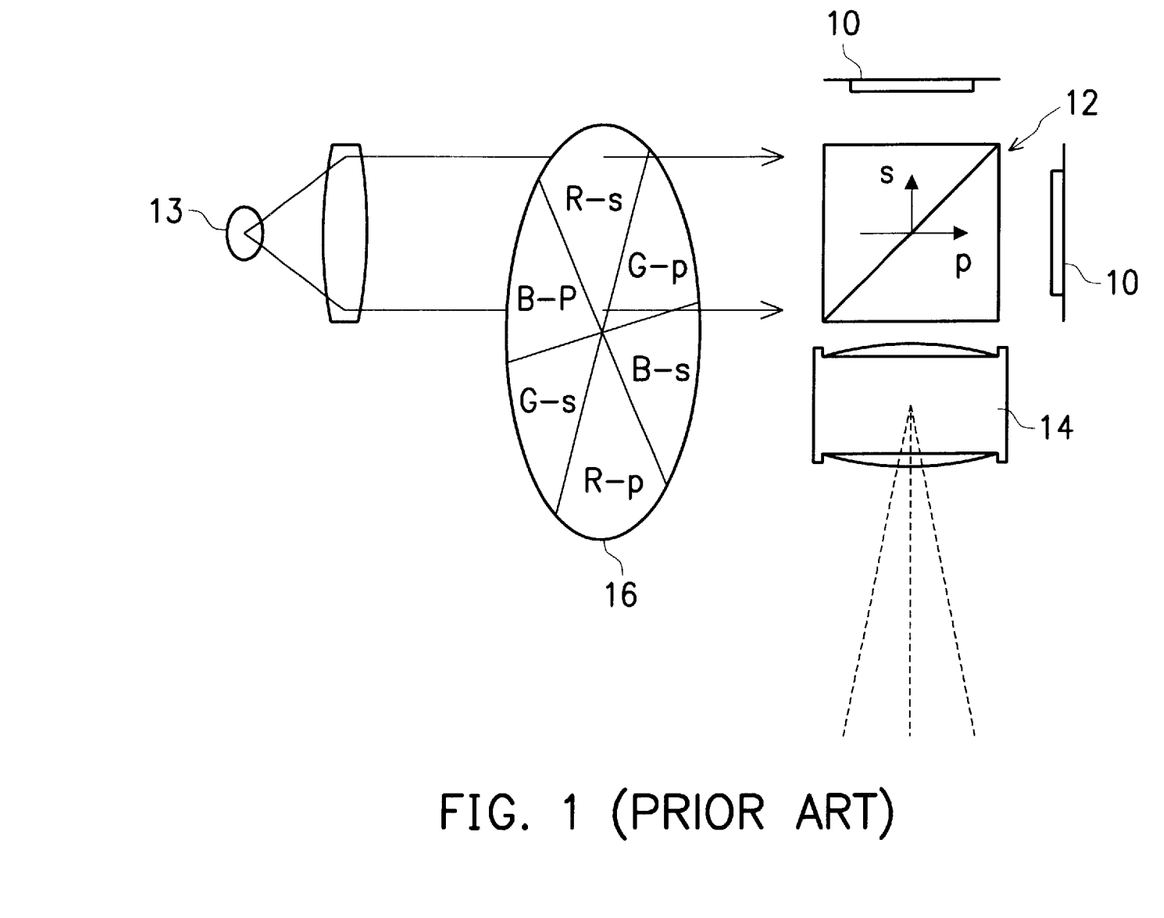
FIG. 1 is a diagram illustrating the structure of a conventional liquid crystal projection display system.

The prior arts, such as the three-panel LCD system disclosed in U.S. Pat. No. 4,904,061 by Aruga and the three-panel projection data monitor disclosed in IBM J. Res. Develop. Vol. 42, No. 3/4, 1998, by R. L. Melcher et al., can provide high light efficiency and high accuracy. However, in order to reduce the volume of the optical engine of an LCD system and simplify the optical design, two-panel or one panel LCD systems have been used to replace three-panel system without degrading the image quality. For example, referring to FIG. 1, U.S. Pat. No. 5,517,340 of Doang et al. passes the light emitted from the light source 13 through the polarizing color filter 16 and the broadband polarizing beam-splitting prism 12 so that s-polarized and p-polarized R, G, B light beams are sequentially incident to two reflective-type LCLVs 10 through two neighboring surfaces of the prism. The light beams reflected by the LCLVs 10 are combined by the prism 12 to form a single light beam, which passes through the projection lenses 14 to present a full-color image.

Figure 2:
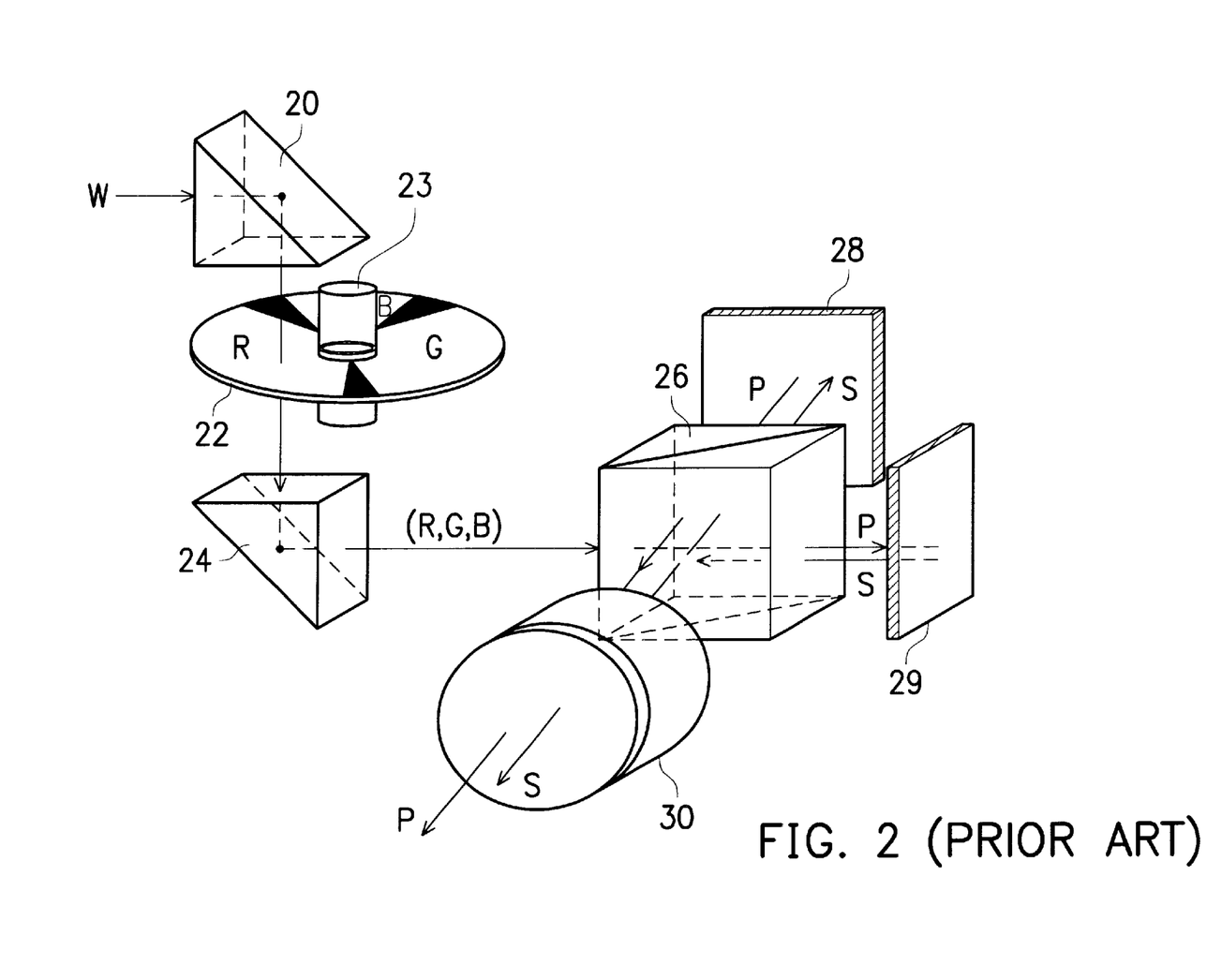
FIG. 2 is a diagram illustrating the structure of another conventional liquid crystal projection display system.

The applicant has disclosed a two-panel reflective-type ferro-electric LCLV system in Taiwanese Patent Application entitled "Field Sequential Dichroic Light Valve". Referring to FIG. 2, the system comprises: a first right-angle prism 20 for guiding the incident light beam; a second right-angle prism 24 for reflecting the light beam to the polarizing beam-splitting prism; a rotary disk 22 for disposing R, G, B color filters to respectively pass only R, G. B light beams; a spindle motor 23 for driving the rotation of the rotary disk 22; a broadband polarizing beam-splitting device 26 for respectively transmitting and reflecting the p-polarized light and the s-polarized light of sequentially produced R, G, B light beams; two fast time response LCLVs 28, 29 for receiving and reflecting the p-polarized light and the s-polarized light of the R, G, B light beams, respectively, so that the p-polarized light is converted to s-polarized light and the s-polarized light is converted to p-polarized light; and projection lenses 30 for projecting the light beam to a screen after the s-polarized light and the p-polarized light respectively reflected by the LCLV 28 and 29 are reflected and transmitted by polarizing beam-splitting device 26. This system is characterized in that the color filters are disposed on the disk. Since the response time of the ferroelectric liquid crystal panel is one thousand times faster than that of a TN (twisted neumatic) type LCLV, the images of s-polarized light and p-polarized light can be simultaneously displayed on the screen. The energy of the light source is therefore effectively used.

Another two-panel system disclosed by ITRI uses a beam splitting device including a color wheel and dichroic mirrors to simplify the optical engine.

Since the response time of ferroelectric LCLV is very fast, using a single panel incorporating the use of a fast field sequential beam splitting/combining component can obtain full-color projection display. For the prior arts shown in FIG. 1 and FIG. 2, using a light source having a linear polarization can easily simplify the two-panel system to a single-panel projection display system. However, the mechanical behavior of the color disk deteriorates the stability of optical engine.

Figure 3:
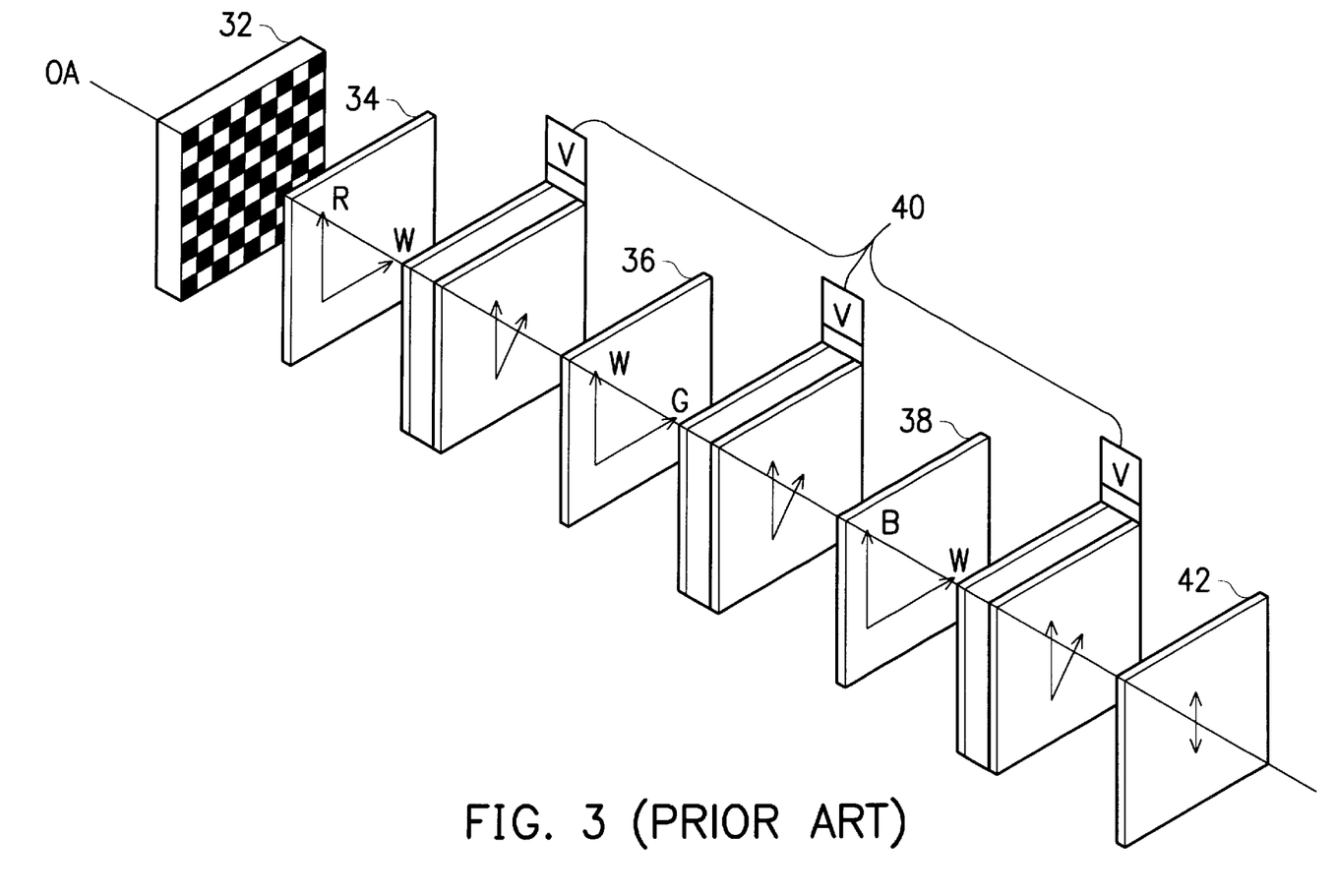
FIG. 3 is a diagram illustrating the structure of another conventional liquid crystal projection display system.

In U.S. Pat. No. 5,347,378, M. A. Handschy et al. disclose a display device as shown in FIG. 3, in which a structure having serially arranged color selective ferroelectric liquid crystal components 40 performs fast time sequential switching, incorporating the use of a monochromatic display panel 32 to form a full-color display system. However, this device uses many polarizers 34, 36, 38 and 42, which absorb a significant part of the light energy.

It is noted from the above description of the prior arts that it is desirable to combine a fast field sequential beam splitting/combining device, optical design with improved light efficiency, and a single panel fast response LCLV.

SUMMARY OF THE INVENTION

Accordingly, the object of this invention is to provide a field sequential color projection display system, which has high brightness, high accuracy and compact size, and is light and energy-saving.

To achieve the above object, this invention uses a fast response light valve, incorporating the beam splitting/combining theory of optical thin film to design a field sequential color projection display system including a single panel LCLV.

Compared with the conventional one-panel LCLV display system or the ferroelectric LCLV display system incorporating a color disk, the field sequential color projection display system of this invention can use the light energy more efficiently and has no drawback due to the mechanical behavior of the color disk.

Moreover, since the ferroelectric LCLV used in this invention has a diagonal dimension shorter than 1 inch and the prism module is compact, the volume of the optical engine is reduced relative to the prior art.

In the field sequential color projection display system of this invention, since the multi-layer thin film of the beam splitting/combining module is a polarizing mechanism, the system does not need to use a front polarizing device for the incident light beam. Thus, the optical engine is simplified and the volume of the system is reduced. Furthermore, the field sequential color projection display system of this invention has a structure good for mass production, providing a high utility for the relevant industry.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 6:
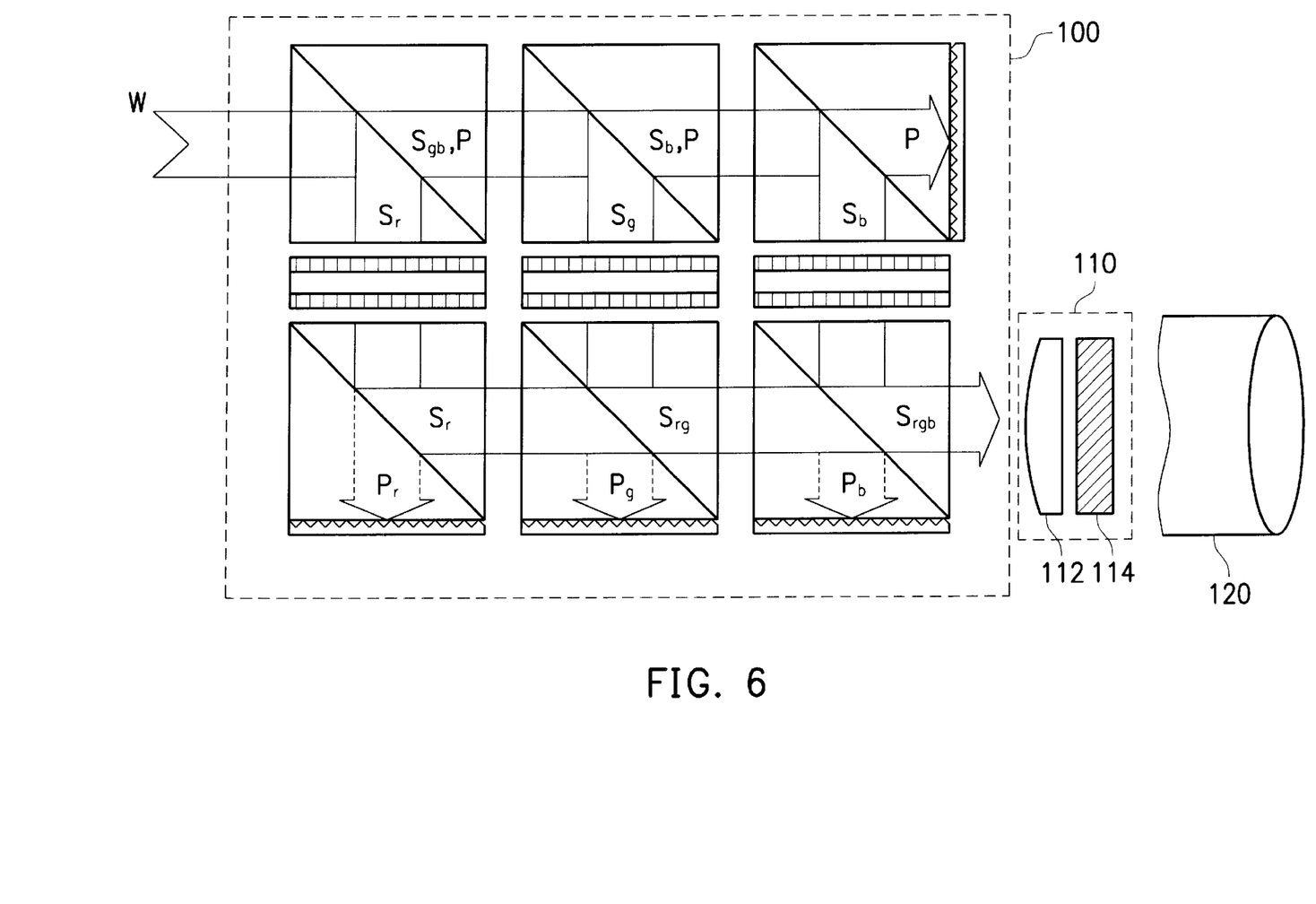
FIG. 6 is a diagram illustrating the field sequential color projection display system according to one embodiment of this invention.

Referring to FIG. 6, according to the first embodiment of this invention, the field sequential color projection display system comprises three modules, i.e., a fast field sequential beam splitting/combining module 100, a fast frame sequential display module 110, and a projection lens module 120. In this embodiment, the fast frame sequential display module 110 adopts the structure of a transmit-type liquid crystal panel. The transmit-type ferroelectric liquid crystal panel 114 is disposed between the condenser lens module 112 and the projection lens module 120. Incorporating the R, G, B light input in time sequence, the ferroelectric liquid crystal panel 114 respectively displays the pixel configurations corresponding to R, G, B colors. The R, G, B light passes through the ferroelectric liquid crystal panel 114 and is projected from the projection lens module 120 to a screen to present a full color image.

Figure 7:
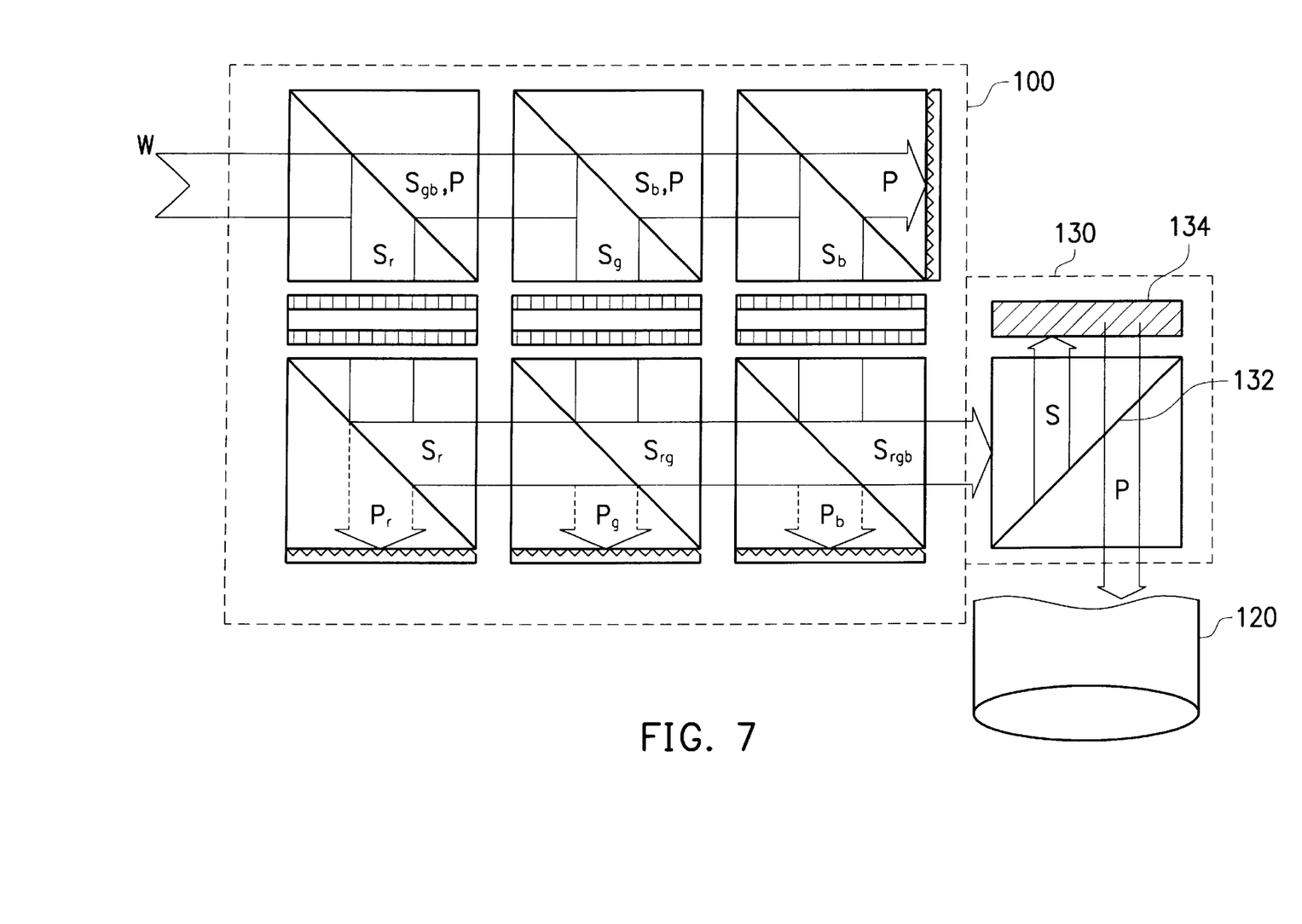
FIG. 7 is a diagram illustrating the field sequential color projection display system according to another embodiment of this invention.

Referring to FIG. 7, according to the second embodiment of this invention, the field sequential projection display system comprises a fast field sequential beam splitting/combining light valve module 100, a fast frame sequential display module 130 and a projection lens module.

In this embodiment, the fast frame sequential display module 130 adopts the structure of a reflective-type liquid crystal panel. As shown in FIG. 7, the s-polarized R, G, B light beams Srgb input in time sequence are reflected by a broadband beam splitting/combining prism 132 to enter the reflective-type ferroelectric liquid crystal panel 134. The s-polarized light beams are converted to p-polarized light beams so that the p-polarized light beams can pass through the broadband polarizing beam splitting prism 132 and are projected through the projection lens module 120 to a screen to display a full color image.

Figure 4:
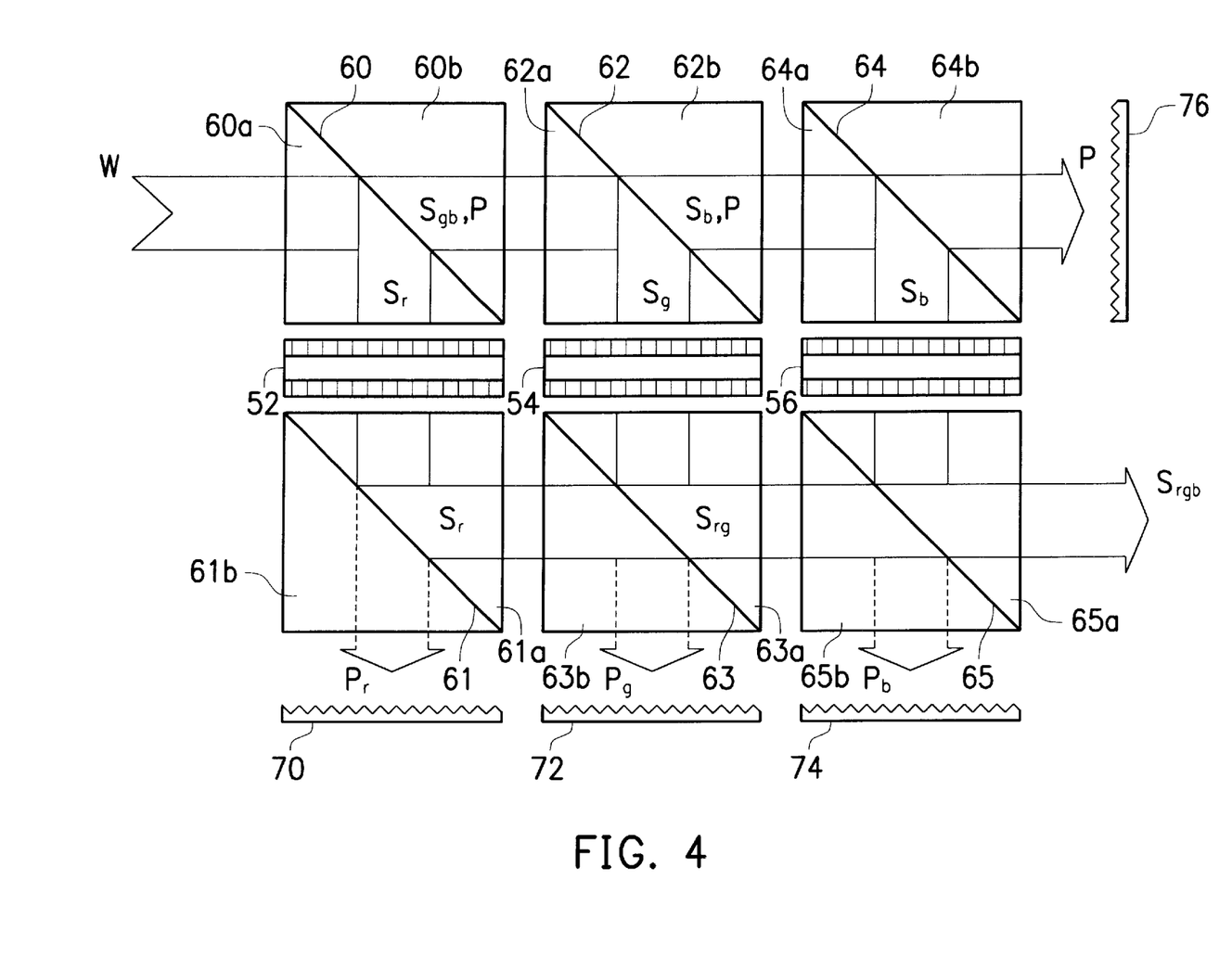
FIG. 4 is a diagram illustrating the structure of the fast field sequential beam splitting/combining device used in this invention.

The detailed description of the fast field sequential beam splitting/combining light valve module used in the field sequential color projection display system of this invention is given below. Referring to FIG. 4, the fast field sequential beam splitting/combining light valve module comprises: a first polarizing beam splitting device including a first polarizing beam splitting component, a second polarizing beam splitting component and a first light valve, wherein when a broadband incident light is incident to the first polarizing beam splitting component, a first polarized light of first spectral range is reflected and a second polarized light of first spectral range and the first polarized light and the second polarized light of other spectral ranges transmit the first polarizing beam splitting component, and when the applied energy field of the first light valve is a negative electric field, the first polarized light passing through the first light valve is reflected by the second polarizing beam splitting component; a second polarizing beam splitting device including a third polarizing beam splitting component, a fourth polarizing beam splitting component and a second light valve, wherein when the first polarized light and the second polarized light of other spectral ranges passing through the first polarizing beam splitting component are incident to the third polarizing beam splitting component, the first polarized light of the second spectral range is reflected and the second polarized light of the second spectral range and the first polarized light and the second polarized light of other spectral ranges except the first spectral range and the second spectral range transmit the third polarizing beam splitting component, and when the applied energy field of the second light valve is a negative electric field, the first polarized light of the second spectral range remains the same polarization and is reflected by the fourth polarizing beam splitting component to incorporate the first polarized light of the first spectral range reflected by the first polarizing beam splitting component to be transmitted through a prism; and a third polarizing beam splitting device including a fifth polarizing beam splitting component, a sixth polarizing beam splitting component and a third light valve, wherein when the first polarized light and the second polarized light of other spectral ranges except the first spectral range and the second spectral range passing through the third polarizing beam splitting component is incident to the fifth polarizing beam splitting component, the first polarized light of third spectral range is reflected and the second polarized light of all spectral ranges passes through the fifth polarizing beam splitting component, and when the applied energy field of the third light valve is a negative electric field, the first polarized light of third spectral range remains the same polarization and is reflected by the sixth polarizing beam splitting component after passing through the third light valve to incorporate the first polarized light of the first spectral range and the second spectral range to be emitted from the sixth polarizing beam splitting component.

Figure 5A:
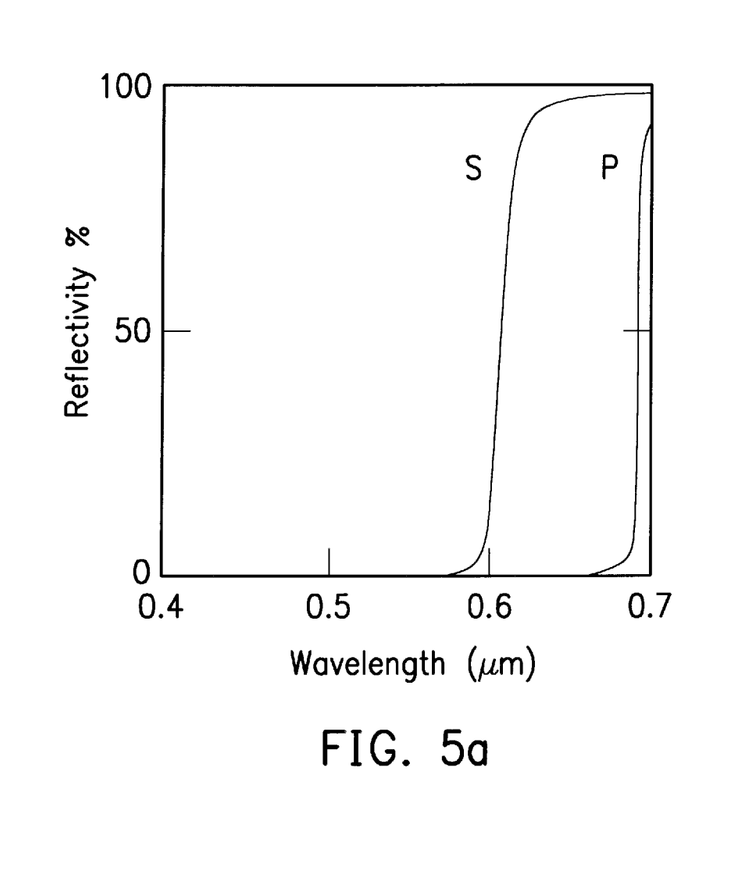
FIG. 5a to FIG. 5d illustrate the reflective spectrums of the components constituting the fast field sequential beam splitting/combining device of FIG. 4.
Figure 5B:
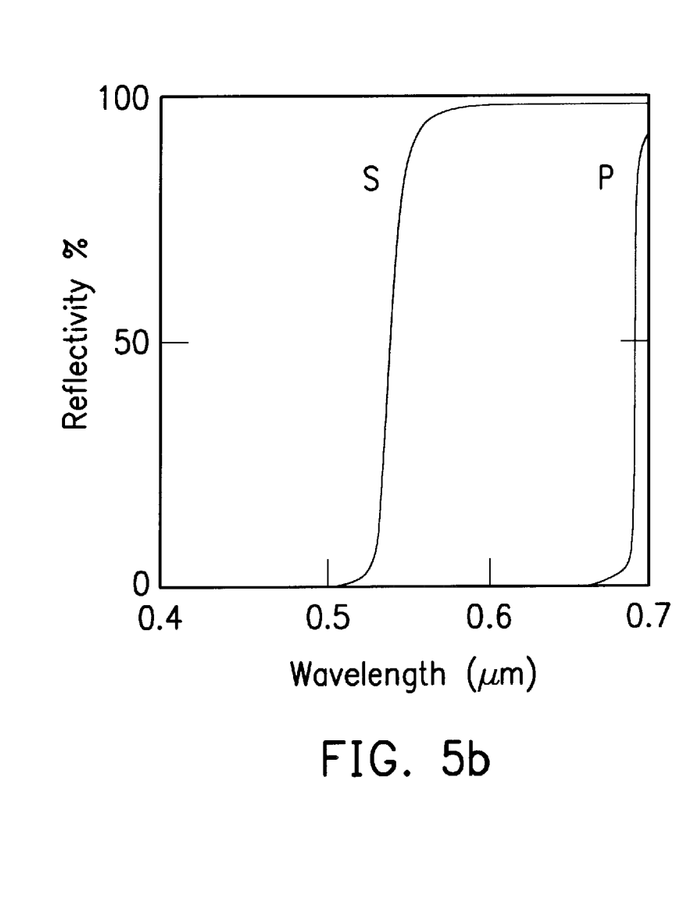
Figure 5C:
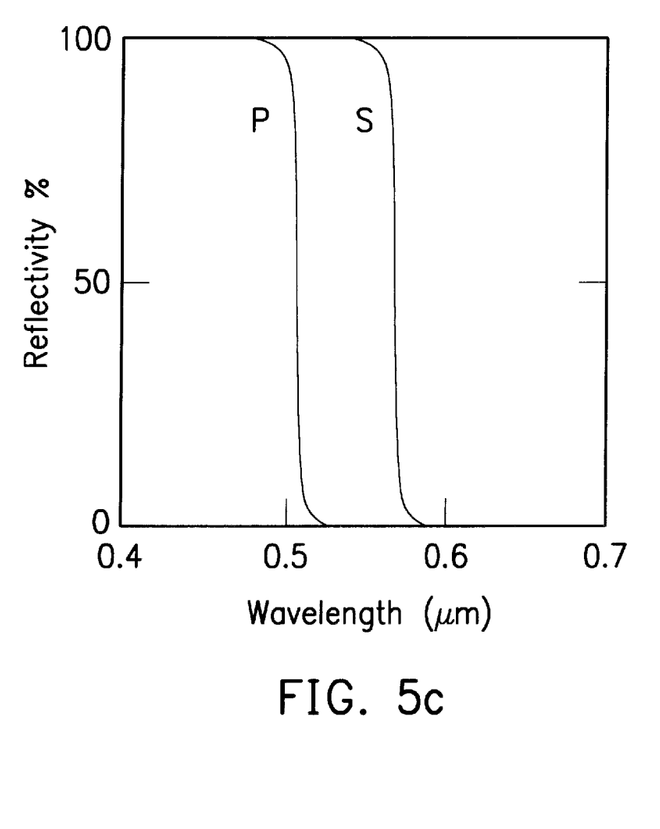
Figure 5D:
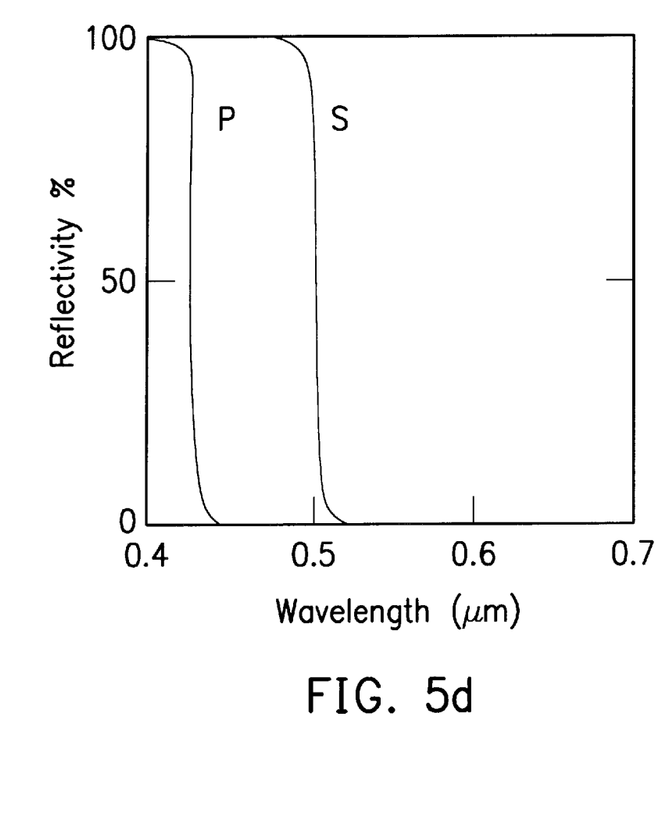

The reflective spectrums of the first polarizing beam splitting component 60 and the second polarizing beam splitting component 61 are as shown in FIG. 5a. Therefore, the first polarizing beam splitting component 60 and the second polarizing beam splitting component 61 can reflect s-polarized red light. The reflective spectrum of the third polarizing beam splitting component 62 is as shown in FIG. 5b. Therefore, the third polarizing beam splitting component 62 can reflect s-polarized green light. The reflective spectrum of the fourth polarizing beam splitting component 63 is as shown in FIG. 5c. The fourth polarizing beam splitting component 63 can reflect s-polarized green light and pass s-polarized red light. The reflective spectrums of the fifth polarizing beam splitting component 64 and the sixth polarizing beam splitting component 65 are as shown in FIG. 5d. The fifth polarizing beam splitting component 64 and the sixth polarizing beam splitting component 65 can reflect s-polarized blue light and pass s-polarized red light and green light. Moreover, the above light valves are ferroelectric liquid crystal light valves (FLCLV), which have a fast time response of less than 20 μsec. However, it is understood that the light valves can be other liquid crystal light valves or other optoelectric switching devices. Furthermore, in the above embodiments, the applied energy field can be a fast positive/negative pulse electric field.

The operation of the field sequential beam splitting/combining light valve module is further described in detail below. As shown in FIG. 4, the incident light is an unpolarized white light. When the incident light passes through the first polarizing beam splitting component 60, the s-polarized red light Sr is reflected, and the s-polarized blue light Sb, the s-polarized green light Sg and the p-polarized white light are transmitted. When the electric field (−E) is applied to the first light valve 52, the s-polarized red light Sr passes the first light valve 52 and is then reflected by the second polarizing beam splitting component 61. The s-polarized red light Sr is emitted from the prism 65a after passing through the fourth polarizing beam splitting component 63 and the sixth polarizing beam splitting component 65. When the electric field (+E) is applied to the first light valve 52, the s-polarized red light Sr rotates to 90 degrees after passing through the first light valve 52 to convert to p-polarized red light Pr that is emitted from the prism 61b.

The s-polarized blue light Sb, the s-polarized green light Sg and the p-polarized white light passing through the first polarizing beam splitting component 60 are transmitted to the third polarizing beam splitting component 62. The s-polarized green light Sg is reflected by the third polarizing beam splitting component 62. When the electric field (−E) is applied to the second light valve 54, the s-polarized green light Sg can directly pass through the second light valve 54 and is then reflected by the fourth polarizing beam splitting component 63. The s-polarized green light Sg is emitted from the prism 65a after passing through the sixth polarizing beam splitting component 65. When the electric field (+E) is applied to the second light valve 54, the s-polarized green light Sg rotates to 90 degrees after passing through the second light valve 54 to convert to p-polarized green light Pg and is then emitted from the prism 63b.

The s-polarized blue light Sb and p-polarized white light passing through the third polarizing beam splitting component 62 transmit to the fifth polarizing beam splitting component 64. The s-polarized blue light Sb is reflected by the fifth polarizing beam splitting component 64. When the electric field (−E) is applied to the third light valve 56, the s-polarized blue light Sb directly passes through the third light valve 56 and is then reflected by the sixth polarizing beam splitting component 65. When the electric field (+E) is applied to the third light valve 56, the s-polarized blue light Sb rotates to 90 degrees after passing through the third light valve 56 to convert to a p-polarized blue light Pb that is emitted from the prism 65b.

Therefore, when the electric field (−E) is in the time sequence of t=t1, t2, and t3, the light beams Sr, Sg, Sb are emitted along the direction of Srgb in time sequence since the above light valves are switched at the alternative electric fields ±E. When the electric field applied to the light valves 52, 54, 56 is +E, the p-polarized red light Pr, green light Pg and blue light Pb are respectively emitted from the prisms 61b, 63b, 65b along the direction perpendicular to the direction of the incident light W. The p-polarized white light Prgb passes through the polarizing beam splitting components 60, 62, 64 are emitted along the direction of the incident light W.

Black absorbers 70, 72, 74, 76 can be used to absorb the p-polarized lights Prgb, Pr, Pg, Pb if the p-polarized light is useless. The black absorbers can be directly coated on the prism surfaces from which each p-polarized light beam is emitted.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives that have been discussed above and all equivalents thereto.

What is claimed is:

1. A field sequential color projection display system comprising:

a field sequential beam splitting/combining light valve module, which can be controlled by applying an energy field, for outputting polarized light of three primary colors in time sequence;

a frame sequential display module for respectively displaying frames of three primary colors corresponding to the polarized light of three primary colors output in time sequence, wherein the polarized light passes through the frame sequential display module; and a projection lens module for projecting the polarized light passing through the frame sequential display module onto a screen to produce a full color image;

the field sequential beam splitting/combining light valve module comprising:

a first polarizing beam splitting device including a first polarizing beam splitting component, a second polarizing beam splitting component and a first light valve, wherein when a broadband incident light is incident to the first polarizing beam splitting component, a first polarized light of a first spectral range is reflected and a second polarized light of the first spectral range and the first polarized light and the second polarized light of other spectral ranges pass through the first polarizing beam splitting component, and when the energy field applied to the first light valve is negative, the first polarized light passing through the first light valve is reflected by the second polarizing beam splitting component, and when the electric field applied to the first light valve is positive the beam with the first polarization of the first spectral range is changed to the second polarization of the first spectral range, the beam passing through the second polarizing beam splitting component and entering into a first black absorber;

a second polarizing beam splitting device including a third polarizing beam splitting component, a fourth polarizing beam splitting component and a second light valve, wherein when the first polarized light and the second polarized light of other spectral ranges passing through the first polarizing beam splitting component are incident to the third polarizing beam splitting component, the first polarized light of a second spectral range is reflected and the second polarized light of the second spectral range and the first polarized light and the second polarized light of other spectral ranges except the first spectral range and the second spectral range pass through the third polarizing beam splitting component, and when the energy field applied to the second light valve is negative, the first polarized light of the second spectral range remains the same polarization and is reflected by the fourth polarizing beam splitting component to incorporate the first polarized light of the first spectral range reflected by the first polarizing beam splitting component to be transmitted through a prism, and when the electric field applied to the second light valve is positive the beam with the first polarization of the second spectral range is changed to the second polarization of the second spectral range, the beam passing through the fourth polarizing beam splitting component and entering into a second black absorber; and a third polarizing beam splitting device including a fifth polarizing beam splitting component, a sixth polarizing beam splitting component and a third light valve, wherein when the first polarized light and the second polarized light of other spectral ranges except the first spectral range and the second spectral range passing through the third polarizing beam splitting component is incident to the fifth polarizing beam splitting component, the first polarized light of a third spectral range is reflected and the second polarized light of all spectral ranges passes through the fifth polarizing beam splitting component and enters a third black absorber, and when the energy field applied to the third light valve is negative, the first polarized light of third spectral range remains the same polarization and is reflected by the sixth polarizing beam splitting component after passing through the third light valve to incorporate the first polarized light of the first spectral range and the second spectral range to be emitted from the sixth polarizing beam splitting component, and when the electric field applied to the third light valve is positive the beam with the first polarization of the third spectral range is changed to the second polarization of the third spectral range, the beam passing through the sixth polarizing beam splitting component and entering into a fourth black absorber.

2. A field sequential color projection display system as claimed in claim 1 wherein the frame sequential display module comprises a condenser lens and a transmit type ferroelectric liquid crystal panel.

3. A field sequential color projection display system as claimed in claim 1 wherein the frame sequential display module comprises a broadband polarizing beam splitting prism and a reflective type ferroelectric liquid crystal panel.

4. A field sequential color projection display system as claimed in claim 1 wherein each of the light valves is a ferroelectric liquid crystal component.

5. A field sequential color projection display system as claimed in claim 1 wherein the applied energy field is a fast alternative positive/negative pulse electric field.

6. A field sequential color projection display system as claimed in claim 1 wherein each of the polarizing beam splitting component is made of two right-angle prisms having a slope coated with an all-dielectric multi-layer film.

7. A field sequential color projection display system as claimed in claim 1 wherein the first black absorber is disposed on or near the emerging face of the second polarization beam splitting component.

8. A field sequential color projection display system as claimed in claim 1 wherein the second black absorber is disposed on or near the emerging face of the forth polarization beam splitting component.

9. A field sequential color projection display system as claimed in claim 1 wherein the third black absorber is disposed on or near the emerging face of the fifth polarization beam splitting component.

10. A field sequential color projection display system as claimed in claim 1 wherein the fourth black absorber is disposed on or near the emerging face of the sixth polarization beam splitting component.

* * * * *